Dec. 21, 1965    E. T. DUNCAN    3,225,186
ELECTRONIC LAMPS
Filed July 3, 1961    6 Sheets-Sheet 1
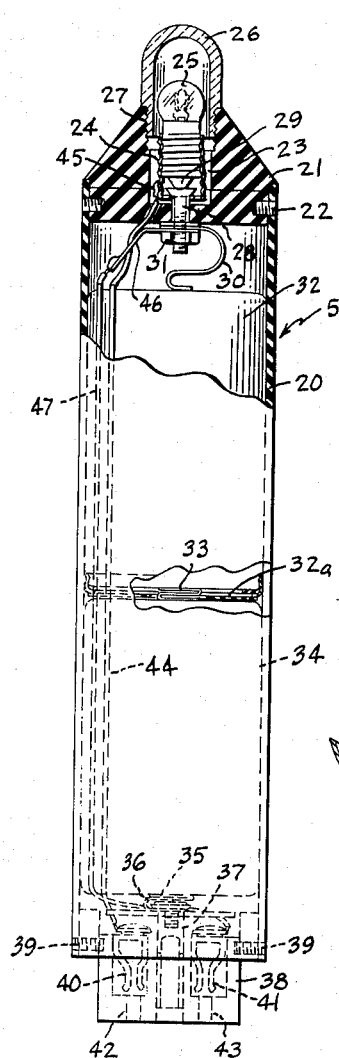
Fig. 4.
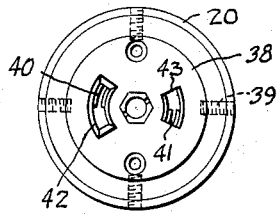
Fig. 5.
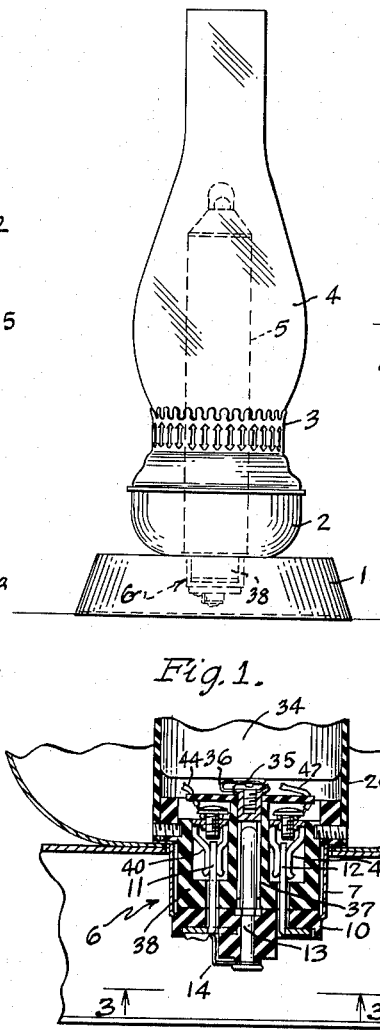
Fig. 1.
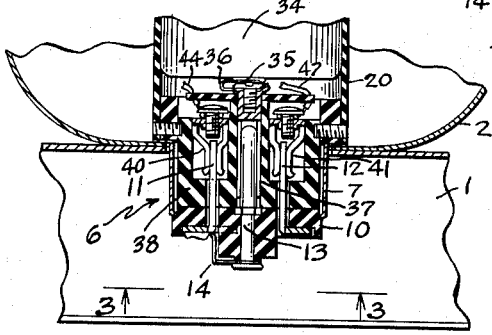
Fig. 2.
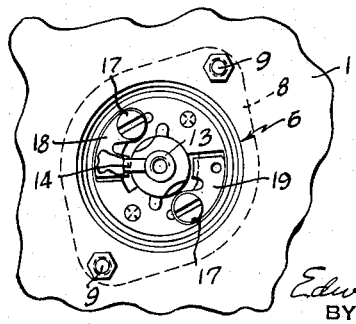
Fig. 3.
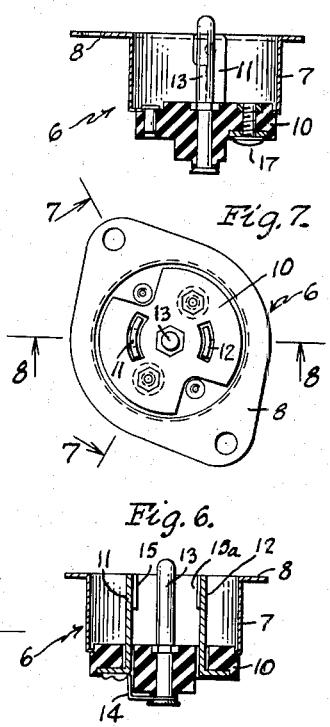
Fig. 7.
Fig. 6.
Fig. 8.
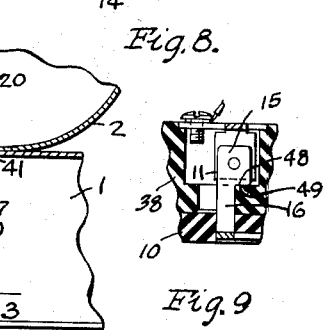
Fig. 9.
INVENTOR
Edward T. Duncan
BY
Wooster, Davis & Cifelli
ATTORNEYS.

Dec. 21, 1965   E. T. DUNCAN   3,225,186
ELECTRONIC LAMPS
Filed July 3, 1961   6 Sheets-Sheet 2
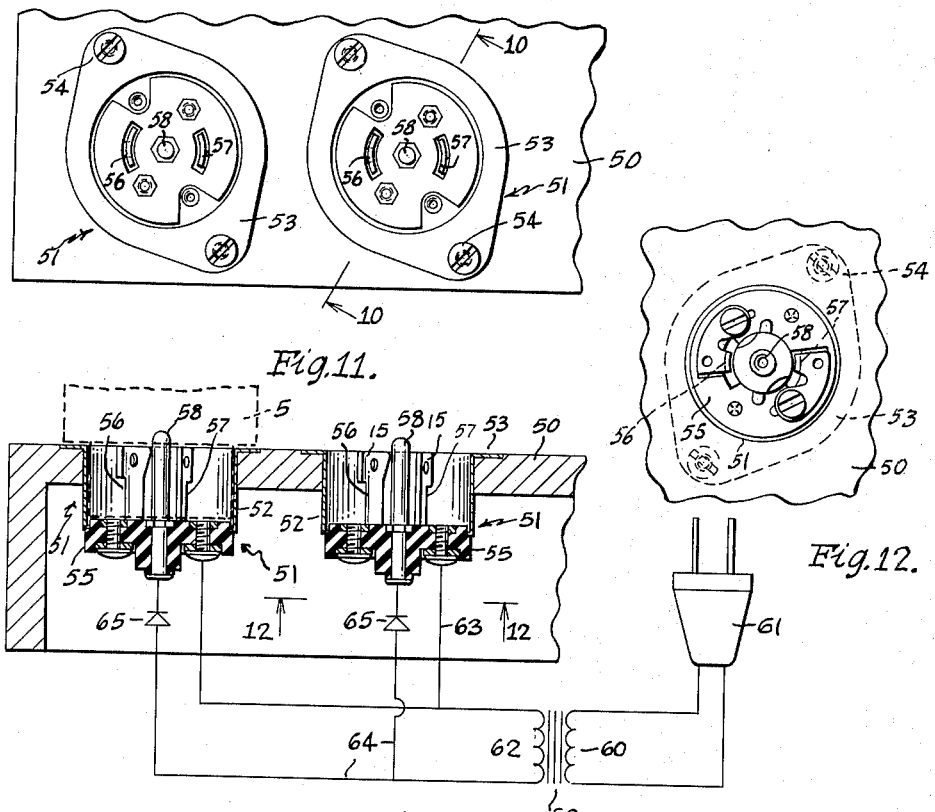
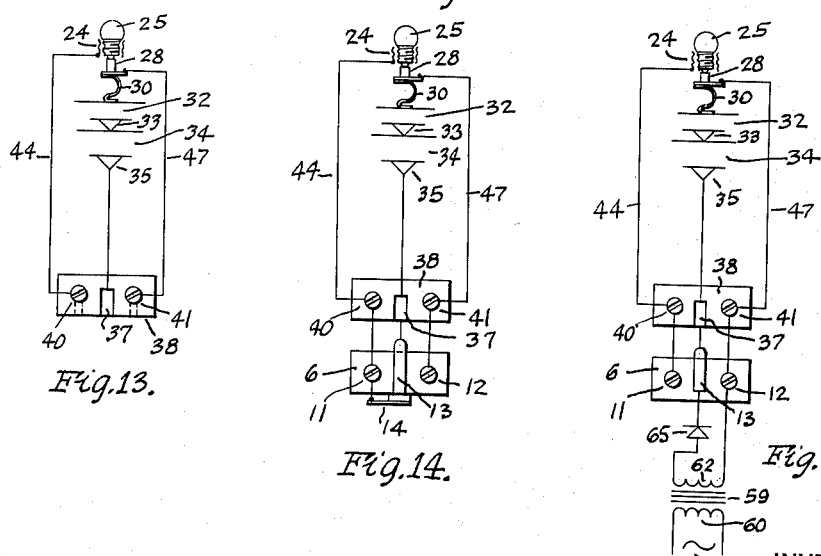
INVENTOR
Edward T. Duncan
BY
Wooster, Davis & Cifelli
ATTORNEYS Dec. 21, 1965  E. T. DUNCAN  3,225,186
ELECTRONIC LAMPS
Filed July 3, 1961  6 Sheets-Sheet 3
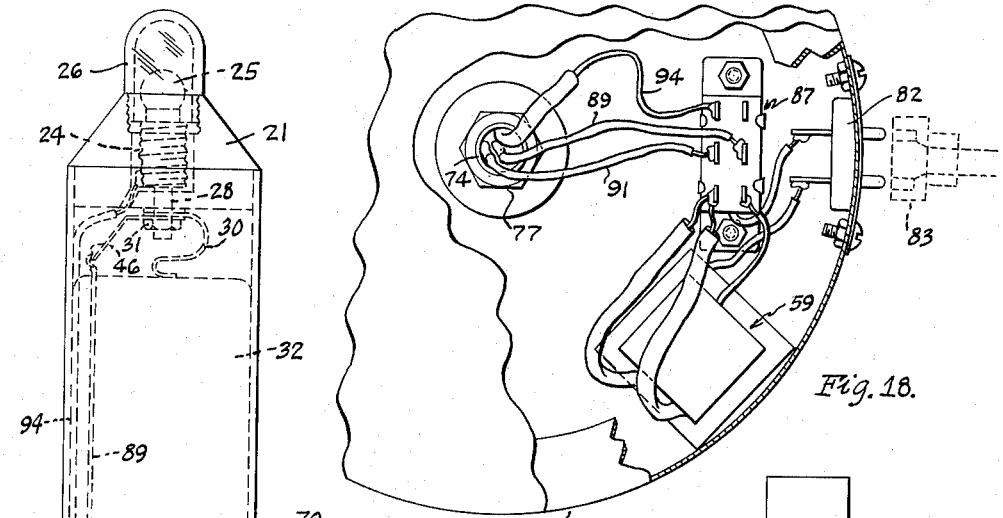
Fig. 18.
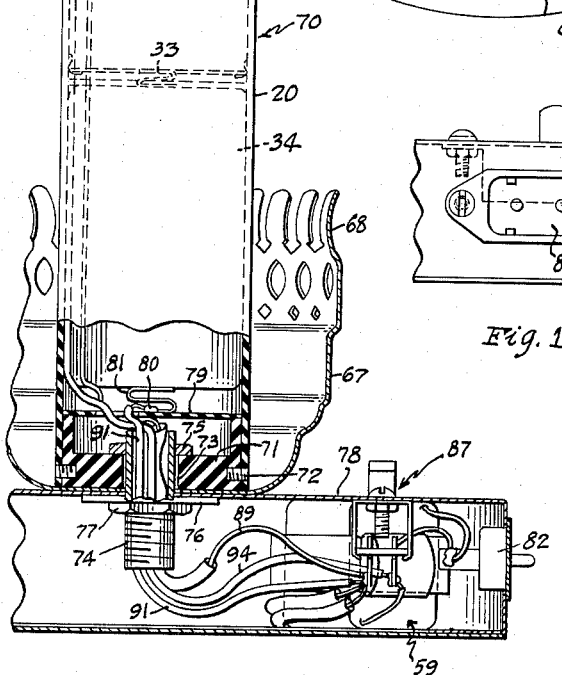
Fig. 17.
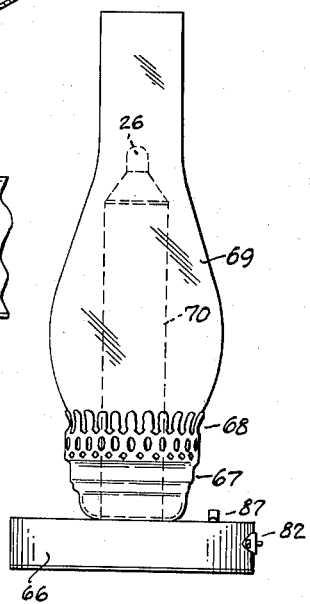
Fig. 19.
Fig. 16.
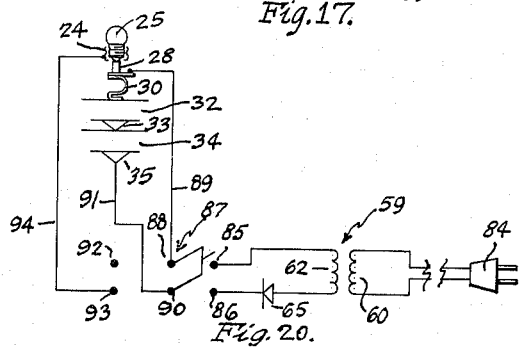
Fig. 20.
INVENTOR
Edward T. Duncan
BY
Wooster, Davis & Cifelli
ATTORNEYS.

Dec. 21, 1965  E. T. DUNCAN  3,225,186
ELECTRONIC LAMPS
Filed July 3, 1961  6 Sheets-Sheet 4
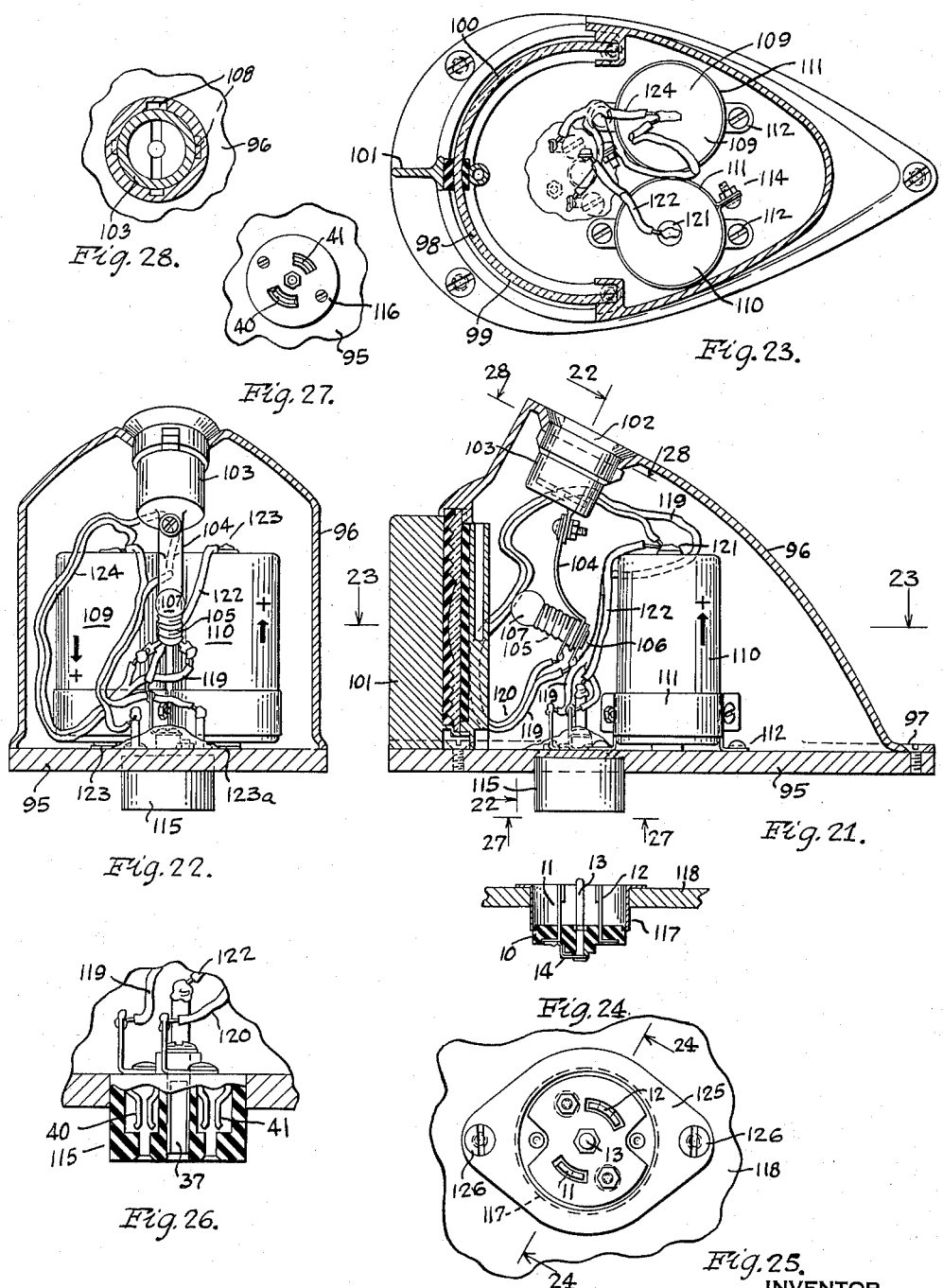
INVENTOR
Edward T. Duncan
BY
Wooster, Davis & Cifelli
ATTORNEYS.

Dec. 21, 1965  E. T. DUNCAN  3,225,186
ELECTRONIC LAMPS
Filed July 3, 1961  6 Sheets-Sheet 5

INVENTOR
Edward T. Duncan
BY
Wooster, Davis & Cifelli
ATTORNEYS

Dec. 21, 1965  E. T. DUNCAN  3,225,186
ELECTRONIC LAMPS
Filed July 3, 1961  6 Sheets-Sheet 6
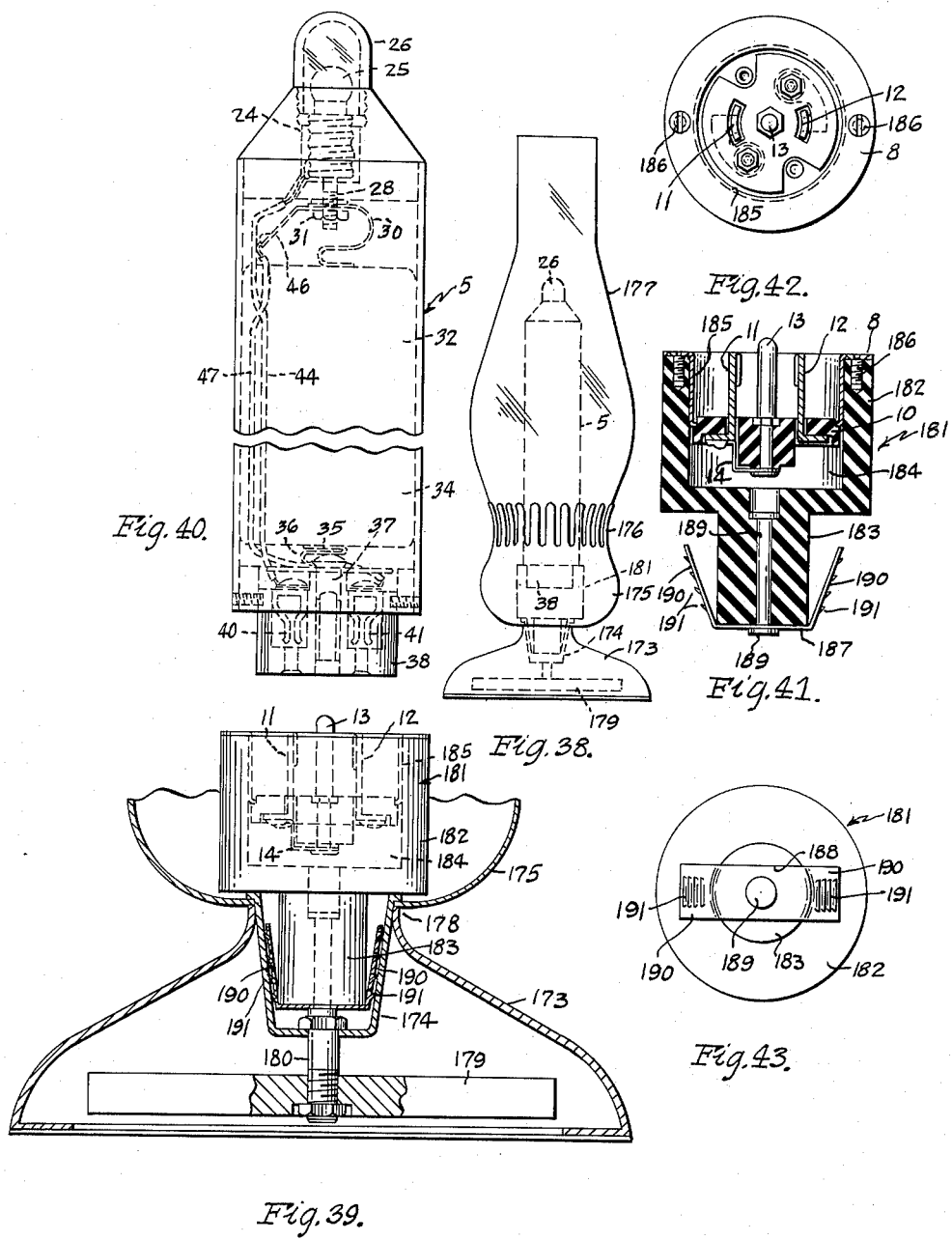
INVENTOR
Edward T. Duncan
BY
Wooster, Davis & Cifelli
ATTORNEYS

United States Patent Office 3,225,186
Patented Dec. 21, 1965

3,225,186
ELECTRONIC LAMPS
Edward T. Duncan, Westport, Conn., assignor to Product Research Associates, Incorporated, Westport, Conn., a corporation of Connecticut
Filed July 3, 1961, Ser. No. 121,515
9 Claims. (Cl. 240—10.64)

This invention relates to electronic lamps, and has for an object to provide such lamps which may be used in different locations without the necessity of plugging into an electric outlet or current supply of wired electrical systems, thus doing away with the connecting cord required with lamps operated from such wired systems, and permitting use of the lamps in any location desired without connection to a wired supply system.

In one embodiment it may be an electronic candle to take the place of the wax candle, for example, commonly used in the taple lamps in restaurants and similar applications, thus eliminating the danger of fire from the open flame and doing away with the electrical conductor cords usually required for table and similar lamps for plugging into the house wiring system. It is also adapted for use in lanterns, running light and navigation lights for boats and airships, coal miners' lamps and similar applications.

Another object is to provide a lamp which may be employed in the usual general shape of a wax candle with a small electric light bulb in the upper end, a receptacle at its lower end for plugging into a socket in the base of the lamp, the electric current being supplied by one or more sealed cells, usually two, of the type which may be recharged, such, for example, as sintered plate nickel cadmium cells, nickel cadmium, alkaline and mercury cells, which can be recharged.

The lamp unit such, for example, as the candle, comprises two circuits, one of which functions when the candle is plugged into the socket in the lamp base to light the lamp bulb, and the other circuit functions when the candle is plugged into a socket in a charging rack to recharge the cells, the cells forming a part of both circuits. The same circuitry is used in the other types of lamps.

With the foregoing and other objects in view, I have devised the construction illustrated in the accompanying drawings forming a part of this specification. It is, however, to be understood the invention is not limited to the specific details of construction and arrangement shown, but may embody various changes and modifications within the scope of the invention.

In these drawings:

FIG. 1 is a side view on a reduced scale of a table lamp which may be used with the candle form of this invention;

FIG. 2 is a section of the base portion of this lamp showing the lower portion of the candle in the position it occupies when plugged into the socket in the base of the lamp;

FIG. 3 is a bottom view of the socket in FIG. 2, the view being substantially as indicated by line 3—3 in FIG. 2;

FIG. 4 is a side elevation of the electronic candle used in the lamp of FIG. 1, with the upper end portion shown in section;

FIG. 5 is a bottom end view of the candle as indicated by line 5—5 of FIG. 4;

FIG. 6 is a top plan view of the socket in the base of the lamp;

FIG. 7 is a section thereof taken on line 7—7 of FIG. 6;

FIG. 8 is a section taken on line 8—8 of FIG. 6;

FIG. 9 is a detail section showing how the candle base is locked in the lamp base;

FIG. 10 is a section showing a portion of a recharging rack for the candle with the lower end portion of the electronic candle shown in dotted lines as plugged into one of the sockets, the section of the sockets being as indicated by line 10—10 in FIG. 11, and the electric wiring system mounted in the panel base for the charging rack shown diagrammatically;

FIG. 11 is a top plan view of the portion of the rack shown in FIG. 10;

FIG. 12 is a bottom end view of the sockets of FIG. 10 taken as indicated by line 12—12 of FIG. 10;

FIG. 13 is a diagram of the wiring for the candle;

FIGURE 14 is a diagram of the wiring when the candle is plugged into the base of the lamp;

FIG. 15 is a diagram of the wiring when the candle is plugged into the recharging rack;

FIG. 16 is a side view on a reduced scale of a lamp using a modified mounting and recharging arrangement for the electronic candle;

FIG. 17 is a partial side elevation and partial section of the lamp of FIG. 16 on a larger scale and showing the recharging means as part of the lamp;

FIG. 18 is a bottom plan view of a portion of the base of FIG. 17 with the bottom wall or cover broken away;

FIG. 19 is a partial side view looking from the right of FIG. 18;

FIG. 20 is a wiring diagram for the lamp of FIGS. 16 to 18;

FIG. 21 is a vertical longitudinal section of another form of the device, of the type used as a running light for boats;

FIG. 22 is a transverse section of the housing and base substantially on line 22—22 of FIG. 21 but showing the elements in elevation;

FIG. 23 is a horizontal longitudinal section substantially on line 23—23 of FIG. 21 with a plan view of the cells;

FIG. 24 is a detail section of a socket in which the device of FIG. 21 is used, taken substantially on line 24—24 of FIG. 25 but on a reduced scale;

FIG. 25 is a top plan view of the device of FIG. 24 on a larger scale;

FIG. 26 is a sectional view of a portion of the lower part of the device of FIG. 21 with a portion of the plug connection;

FIG. 27 is a bottom end view of this plug taken substantially on line 27—27 of FIG. 21;

FIG. 28 is a detail section substantially on line 28—28 of FIG. 21;

FIG. 38 is a side view on a reduced scale of a standard form of lamp adapted for use with a wax candle but showing an adapter to render it applicable for use with this candle;

FIG. 39 is a partial section of the lamp base on a larger scale showing the adapter in side elevation;

FIG. 40 is a side view of the candle lamp used with this adapter;

FIG. 41 is a longitudinal section of the adapter;

FIG. 42 is a top plan view thereof, and

FIG. 43 is a bottom plan view of the adapter of FIG. 41.

Figure 34:
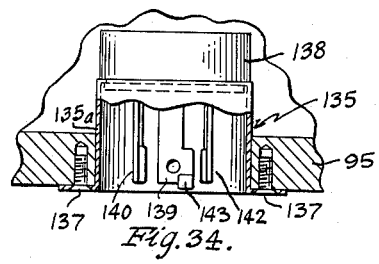
FIG. 34 is a partial section and partial side elevation of the cooperating connecting member for connecting the running light to the device of FIGS. 32 and 33.
Figure 35:
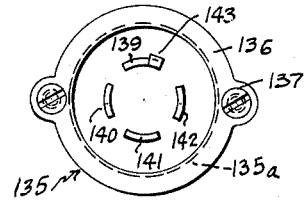
FIG. 35 is a bottom view of the socket of FIG. 34.

Referring first to the electronic candle type of lamp with its recharging means shown in FIGS. 1–15, it may be of any suitable type, but that shown is a table lamp such as is used on a table in restaurants employing a wax candle. This device is an electronic candle devised to take the place of the wax candle, it being designed to be recharged at night and during the day, and then used as a lighting element in the evening, it having an operational lighting capacity of about twelve hours with a recharging period of about sixteen hours. As it takes the place of the wax candle it gives a steady light, eliminating the use of the bare flame involved with the use of a wax candle, with its safety feature, and also uniform appearance, and also eliminating other difficulties involved in the use of open flame wax candles. It also eliminates use of the usual plug-in cap and cord normally used with electric table lamps.

The lamp is shown as comprising the usual hollow base 1 with the sheet metal shell 2 mounted on the top wall thereof provided with the fingers 3 at its upper end to hold a glass or plastic chimney 4 enclosing the electronic candle 5. Mounted in an opening in the lower part of the shell 2 and the top wall of the base 1 is a socket member 6, which includes a shell 7 provided with an upper flange 8 resting on the top of the bottom of the shell 2, and secured to the shell and the base 1 by screws 9. In the lower end of this shell is an end member 10 of insulating material carrying two upright blade contacts 11 and 12 located within the shell 7. This end wall also carries a central pin contact 13, also located within the shell, and projecting upwardly from the end wall 10 between the blade contacts, and of a length to extend somewhat above the top of the flange 8 at its upper end, as shown in FIG. 8. The blade contact 11 and the pin contact 13 are electrically connected by a conductor strip 14 for a purpose which will presently be described. The upper end portions 15 and 15a of the blade contacts 11 and 12 are wider than the connecting and mounting leg portions 16, as shown in FIG. 9, so as to form a locking means for locking the electronic candle in the socket, by means of shoulders on the contact blades overhanging a wall 48 in the cooperating receptacle 38, as will later be described. The blade contacts 11 and 12 are mounted in the end member 10 by suitable securing screws 17 passing through laterally extending end plates 18 and 19 (FIG. 3) located at the under side of the member 10.

The electronic candle of the form shown in FIG. 4 comprises an outer tubular shell 20 of plastic or other suitable insulating material, and is open at both ends. Secured in the upper end is a tapered insulated head member 21 provided with a reduced lower end portion inserted in the upper end of the shell 20, and secured by suitable screws 22. This head member is recessed from its upper end, as indicated at 23, in which is mounted a screw shell lamp socket contact 24 for a small electric lamp bulb 25. This bulb is also enclosed in a translucent plastic domed member 26 providing protection for the bulb and also forming a light-diffusing element. This dome may be threaded into the open end of the recess 23, as indicated at 27.

There is also provided in this lamp socket a central contact 28 insulated from the shell 24 and passing through the bottom of the recess 23 and the lower wall of the head member 21. This central contact is so located as to be engaged by the central contact 29 of the lamp bulb 25, and mounted on this central contact 28 below the head member 21 is a spring conductor strip 30 in the form of a bowed member and secured to the central conductor contact 28 by any suitable means, such as a washer and nut 31. At its lower end this spring member 30 engages the upper end of the negative pole or shell of the sealed type electric cell 32. The opposite or positive element or pole of this cell is connected by a conductor strip 33 with the upper end of the negative element or pole of a second sealed cell 34, the ends of the two cells being separated by the insulating disc 32a. The opposite center pole or positive element 35 of cell 34 is connected by a conductor strip 36 with a central tubular contact member 37, mounted in the insulating plug member 38, which is mounted in the lower end of the shell 20 and secured therein by suitable screws 39. This central tubular member 37 forms a central electrical contact in the center of the plug-in receptacle member 38, and is in a passage in the plug member open at the lower end thereof.

Also mounted in this plug member 38 is a pair of receptacle spring contacts 40 and 41, and the plug body 38 is provided with slots 42 and 43 leading from the lower end of the plug to these contacts and forming entrance slots to receive the contact blades 11 and 12 of the socket 6 mounted in the base of the lamp. These two socket entrances 42 and 43 are of different widths (42 being wider than 43) and the contacts 11 and 12 are also of different widths at their upper ends (11 being wider than 12), so that they are polarized and the receptacle plug 38 can thus be inserted in the socket 6 in one position only, so that the receptacle contact 40 can engage only the blade contact 11 and the receptacle contact 41 can engage only the blade contact 12, while the central pin contact 13 telescopes into the tubular contact 37 and thus provides electrical connection between them. As the upper end of pin 13 projects above the flange 8, it enters the passage containing contact 37 before blade contacts 11 and 12 enter the slots 42 and 43 and thus provides guide means on which the candle may be turned to align the slots 42 and 43 with the proper blade contacts.

There is a conductor wire connection 44 between the contact 40 and the shell 24 of the lamp socket, as indicated at 45. There is a second strap for the contact member 46 on the central contact 28 of the lamp socket, and this is connected by conductor wire 47 with the contact 41. Thus when the receptacle plug member 38 at the lower end of the candle 5 is plugged into the socket 6 in the lamp base, contact 40 engages the blade contact 11, receptacle contact 41 engages the blade contact 12, and the central tubular contact 37 telescopes with and has electrical contact with the contact pin 13. As this contact 13 and the blade contact 11 are short-circuited or connected by the conductor strap 14, this closes the lamp circuit through the cells 32 and 34, lighting the lamp bulb 25, the circuit being from the positive contact 35 of the lower cell through the central contact 37, pin contact 13, connector 14, blade contact 11, wire 44, through the lamp screw shell 24, lamp bulb 25, central contact 28, conductor strip 30, through the negative contact of the cell 32. This is shown diagrammatically in FIG. 14.

The circuitry of the electronic candle by itself is shown diagrammatically in FIG. 13. After the receptacle socket 38 is inserted or plugged into the socket 6, it may be locked in position in this socket by turning the candle clockwise or to the right a short distance. This will carry the widened upper ends 15 and 15a of the blade contacts over inner shoulders 48 at the inner side of the inlet slots 42 and 43, as shown in FIG. 9, the widened portions 15 and 15a each forming an overhanging shoulder 49 engaging over a shoulder 48. The blade contacts 11 and 12 and receptacle contacts 40 and 41 are of a width such that electrical contact between the receptacle contacts 40 and 41 and the blade contacts 11 and 12 is established as the receptacle plug is plugged into the socket 6, and this electrical contact is maintained as the candle is turned to and from the locked position. This locking means and position is important in discouraging unauthorized removal of the candle from the lamp by patrons of the restaurant. As the tubular contact 37 of the receptacle is telescoped with the central pin 13 it permits this turning action to and from the locked position, and also maintains electrical contact during these movements.

Means for recharging the cells is shown in FIGS. 10 to 12 with the wiring diagram indicated in FIG. 15. These cells are of the sealed rechargeable type, such, for example, as the sintered plate nickel cadmium cell, alkaline or mercury type or any of the rechargeable type cells. Recharging means is shown as a hollow base or panel 50 in the top wall of which is mounted plug-in sockets 51. These sockets are mounted in openings in the top wall and may be any suitable number depending on the number of the electronic candles it is desired to recharge at one time. In the drawing, only two of these sockets are shown, but, as indicated, any number may be used depending on the capacity desired. These sockets each comprise a shell 52 seated in an opening in the top wall 50 and supported by a flange 53 secured to the top wall be any suitable means, such as the screws 54. Mounted in each shell is a lower end member 55 of insulating material carrying two blade contacts 56 and 57 and a central pin contact 58. These contacts and the shell are the same as the socket 6 in FIG. 8, except that the transverse connecting conductor 14 is omitted so that there is no electrical connection in the socket itself between the contacts 56, 57 and 58. The blade contact 56 corresponds to the contact 11, the blade contact 57 corresponds to the contact 12, and the central pin contact 58 corresponds to the pin contact 13 of the socket 6.

The recharging means comprises a transformer 59, the primary coil 60 of which may be connected to a source of A.C. supply by means of a plug-in cap 61. The opposite ends of the secondary coil 62 are connected respectively to the blade contacts 57 by the leads 63 and to the central pins 58 by the leads 64, there being in the connection to the positive central contact 58 a blocking diode or rectifier 65. Although the transformer and diode are shown diagrammatically, it will be understood they are mounted within the hollow base 50. The blocking diode is to provide a unidirectional charging current and also to prevent overcharging feed-back that might affect other units on charge. The capacity of the transformer is designed to supply proper current and voltage for the number of recharging sockets mounted in one recharging rack. Ordinarily, the voltage is reduced from the usual 110 volts to about 2.6 volts (for the closed circuit in the cells), or whatever is the proper voltage for the particular cells employed. The amperage capacity will depend on the number of candles to be recharged at one time. When the electronic candle is plugged into one of the sockets 51, as indicated by the dotted lines in FIG. 10, the receptacle contact 40 is engaged with the blade contact 56, the receptacle contact 41 is in engagement with the blade contact 57, and the central tubular contact 37 is telescoped over and in engagement with the central pin contact 58. As there is no conductor 14 connecting the contacts 56 and 58, the light bulb circuit is broken, but the charging circuit comprising the secondary 62 of the transformer, lead 64, diode 65, central contacts 58 and 37, 35 of the cell, negative pole of the cell to contact 30 and conductor wire 47 back to the receptacle contact 41, blade contact 57 and lead 63 to the other end of the transformer secondary is a closed recharging circuit for the two cells 32 and 34. The lighting circuit is shown open in FIG. 15 and the recharging circuit is shown closed or completed.

Thus, in this electronic candle the circuitry comprises two circuits, one the lighting circuit through the lamp bulb, and the other the recharging circuit for the cells, the cells forming a part of both circuits. Thus the lamp or lighting circuit is closed and the recharging circuit is open when the candle is plugged into the socket 6 in the lamp base, as shown diagrammatically in FIG. 14, and the lighting circuit is open and the recharging circuit is closed when the lamp is plugged into the recharger socket 51, as shown diagrammatically in FIG. 15.

In use, the candle is merely plugged into the socket in the lamp, which automatically lights the light bulb, and it remains lighted as long as the candle remains in the socket and the cells are not run down. It may be locked in the lamp by turning a partial revolution to the right or clockwise. After the restaurant is closed at the end of the evening, the candle is merely removed from the lamp and plugged into the recharging device of FIGS. 10 to 12, and left overnight or until the next day when wanted for use the next evening. During this time the cells are recharged and ready for operation of the lighted candle for this next evening.

In the form of the device shown in FIGS. 16–20, the electronic candle is shown as permanently mounted in the lamp as part thereof, instead of being detachable in the ordinary sense of the term, as described in connection with the device of FIGS. 1–4. In such an arrangement the elements for recharging the cells of the candle are mounted as part of the lamp. In the form shown they are mounted in the hollow base. Thus in these figures the hollow base is indicated at 66 on which is mounted the shell 67 provided with holding fingers 68 for the glass or plastic chimney 69. The electronic candle 70 comprises the outer tubular shell 20, the same as in the first form, at the upper end of which is mounted the insulating head 21, the lamp bulb 25 in the screw shell 24 enclosed in the translucent dome 26, the same as in the first form, with the bulb connector strip 30 connecting the central contact 28 with the negative pole of the upper cell 32. However, in the lower end of the casing, instead of the plug-in receptacle 38, there is an insulating end wall or plug 71 secured by suitable screws 72 and having a central opening 73 through which extends an externally threaded tube or stud 74, with a nut 75 on the inner or upper side of the end plug 71 and a suitable washer 76 and nut 77 on the under side of the top wall 78 of the base. This tube and these nuts clamp on opposite sides of the plug 71 together with lower wall of shells 67 and top wall 78, and securely mount the candle light in the shell and on the base. The shell 67 may be secured to the base by soldering or other suitable means. At the upper side of the plug 71 is an insulating disc 79 carrying a central contact 80 connected by a conductor strip 81 with the central or positive pole of the lower cell 34, the two cells being connected by the intermediate conductor strip 33, the same as in the first form.

The transformer 59 is mounted in the base 66, and its primary coil 60 is connected to a plug-in connector 82 mounted in a side wall of the base adapted to receive a receptacle plug 83 (FIG. 18) connected to a plug-in cap 84 which may be plugged into a receptacle outlet of the usual 110 volt house wiring system. The secondary coil 62 of the transformer is connected to the two poles 85 and 86 of a two-pole double-throw switch 87, one pole 88 of which is connected to the central lamp contact 28, as indicated at 89, while the other pole 90 is connected by lead wire 91 to the positive or central pole 35 of the lower cell 34 by the connector 91. The other two contacts 92 and 93 of the switch are as indicated in FIG. 20, the contact 92 being a dead end contact, while the contact 93 is connected by conductor lead 94 to the screw shell lamp contact 24.

Thus, this electronic candle has two circuits, the same as in the first form of FIG. 4, controlled by switch 87, these two circuits being the lighting circuit for the lamp bulb and the recharging circuit for the two cells, the same as in the first form. Thus, when the switch is in the open position, as shown in FIG. 20, both circuits are open. When it is thrown to the right so that the two bars of the switch engage the contacts 85 and 86, the recharging circuit from the transformer secondary to the cells is closed, there being a diode rectifier 65 in the lead from the coil to the central contact 35 of the lower cell. When the switch is thrown to the left or the opposite position with its bars engaging the contacts 92 and 93, the recharging circuit is open and the lamp bulb circuit is closed through the lead 91, the switch contacts 90 and 93 and the lead conductor 94. The lead wires or conductors 89, 91 and 94 are led from the switch through the hollow stud or tubular connector 74 to the various connections within the candle, as indicated in FIGS. 17 and 18. Thus, in this form of the lamp, the lighting and recharging circuits with their control means are a permanent part of the lamp, but it is used without the connecting cord plugged into the house wiring system when employed as a lighting unit, and is merely plugged into this system for the recharging operation.

Because this electronic candle principle and lighting circuit is adapted for use as a separate unit when entirely disconnected from and independent of any supply circuit for electricity, such as the usual 110 volt A.C. supply of a house wiring system, it is adapted for use in various locations where such a supply system is not available for plugging in of the lamp during its operation as an illuminating unit. Therefore, it is peculiarly adapted for use as running or naviagation lights for boats and airplanes, or other mobile units. A lamp adapted for such use is shown in FIGS. 21–28. This lamp is shown in a form commonly used as a running light for boats, with a tear-shaped base 95 and a metal casing 96 mounted on the top thereof by any suitable means, such as the screws 97, this casing being open on the larger side which is closed by a glass lens element 98 having the usual green and red colored portions 99 and 100 respectively on opposite sides of the upright dividing louver 101.

At the top of the housing is an access opening 102 in which is mounted a removable plug 103 bearing a support 104 for the lamp socket comprising the usual screw shell 105 and central contact 106 for the lamp bulb 107. The plug 103 is held in place by a T-slot connection indicated at 108, which permits removal of the plug 103 to renew or inspect the light bulb by turning the plug a partial revolution to a released position. Mounted within the housing in suitable supports are the two sealed rechargeable cells 109 and 110, these cells being supported by any suitable means, that shown being two flat split rings 111, mounted by suitable lugs 112 on the top of the base 95 by means of suitable screws 113, the cells being removably clamped in the rings by suitable clamping screws 114.

Mounted in the base 95 and projecting downwardly from the lower side thereof is a plug-in receptacle 115, it being mounted in a recess extending upwardly from the lower side of the base partway through the base, and secured by suitable screws 116. This receptacle is the same as the plug-in receptacle 38 of the first form, and is adapted to be plugged into a receiving socket 117 mounted in an opening in the deck or other suitable support 118 of the boat, this socket 117 being the same as the lamp socket 6 of the first form.

The wiring diagram and connections are the same as for the lamp of FIGS. 1 and 2 except the connections to the lamp socket contacts are reversed, and as indicated diagrammatically in FIGS. 13 and 14, instead of mounting the electric cells within a candle shell, as indicated in FIG. 4, they are mounted in the housing or shell 96, as in FIGS. 21, 22 and 23, with leads connecting the two cells in series with the lamp bulb through the plug-in receptacle 115 and the receiving socket 117. The contacts in the receptacle 115 and the socket 117 are the same as in the receptacle 38 and socket 6 respectively, and are therefore given the same reference numerals. Thus in this set-up the contact 40 is connected by lead 119 to the central contact 106 of the lamp socket; the receptacle contact 41 is connected to the screw shell contact 105 by the lead 120, and the central tubular contact 37 is connected to the central contact or pole 121 of cell 110 by the lead 122, the central contact 121 corresponding to the lower central contact 35 of the cell 34. The negative element of cell 110 is connected to the positive element 123 of the cell 109 by conductor 123a, and the negative element of this cell 109 is connected to the screw shell contact 105 of the lamp socket by the lead 124 corresponding to conductor 30 of the first form.

When the receptacle plug 115 is plugged into the socket 117 the circuit is closed through the cells and the lamp bulb 107 by the central pin 13 telescoping in the central contact 37, the contact 40 engaging the blade contact 11, and the cross-over connection 14, the same as in the device of FIGS. 1–4 when the candle is plugged into the socket 6. The socket 117 is mounted in an opening in the deck or similar support 118 and supported therein by flange 125 and secured by suitable screws 126. After the receptacle 115 is plugged into this socket it is turned a partial revolution to lock it in the socket, which thus automatically locks the lamp to the deck or other support. This is important in this type of device, where otherwise the vibration incident to movement of the boat and beating of the waves, might loosen the lamp and cause it to be detached from this socket or support.

Figure 29:
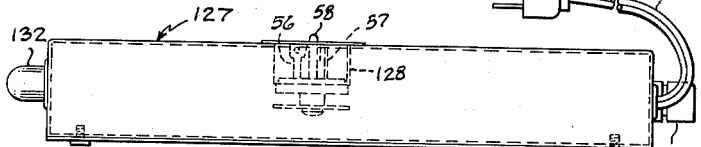
FIG. 29 is a side view of a recharging rack for the device of FIG. 21.
Figure 31:
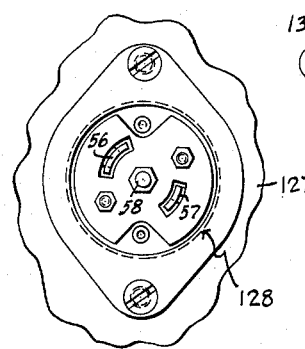
FIG. 31 is a top plan view of the socket of FIGS. 29 and 30.
Figure 30:
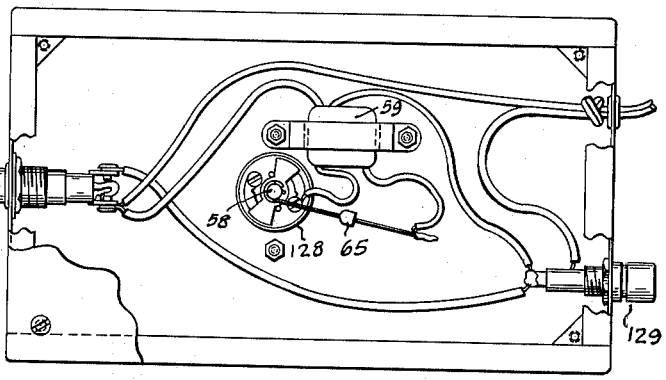
FIG. 30 is a bottom plan view thereof with a portion of the bottom cover wall removed.

The cells 109 and 110 of this lamp may be recharged in a device similar to the recharging rack of FIGS. 10 and 11. Such a recharging device is shown in FIGS. 29 and 30, comprising a hollow shell or base 127 in the top wall of which is mounted a plug-in socket 128 which is the same kind of socket as the socket 51 of the device of FIGS. 10 and 11, and has the same central contact pin 58 and blade contacts 56 and 57 to engage the contacts of the plug-in receptacle 115, the same as described in connection with the device of FIGS. 10 and 11, and as described in connection with the candle of FIG. 4. In this case the recharging elements are also mounted within the base or rack 127, which comprise the transformer 59 and diode 65 in the lead between the secondary coil of the transformer and the central contact 58 of the socket 128. In this case there is a control switch 129 in the lead connections 130 from the plug-in cap 131 to the primary coil of the transformer, this plug 131 being adapted to plug into a receptacle of a 110-volt A.C. supply, such as may be provided on a dock for recharging boat batteries. There may also be enclosed in the circuit between the switch and the transformer a pilot light 132 to indicate when the circuit is turned on. Otherwise, this functions the same as the charging device of FIGS. 10 and 11, when the plug-in receptacle 115 of the running light is plugged into the receptacle 128. Thus this running light or lamp has the same two circuits as the candle lamp of FIG. 4 and its plug-in socket in the lamp, as well as the plug-in socket in the recharging device; that is, it has the lighting or lamp circuit comprising the two cells, the central contacts 13 and 37, the cross-over conductor 14 and contacts 11 and 40 for operating the light circuit when the lamp is plugged into the socket 117, and the second or recharging circuit comprising the two cells, the central contacts 58, 37 and 106, together with the blade contact 57 and receptacle contact 41, to provide a recharging circuit when the lamp is plugged into socket 128 of the recharger.

Figure 33:
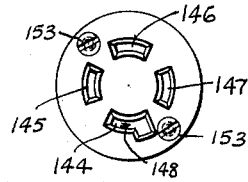
FIG. 33 is a top plan view of the receptacle of FIG. 32.
Figure 36:
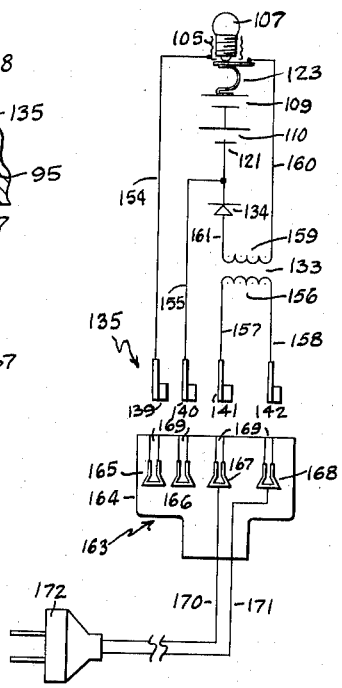
FIG. 36 is a wiring diagram of the modified running lamp used with the device of FIGS. 32 to 35 and the recharging means therefor.
Figure 37:
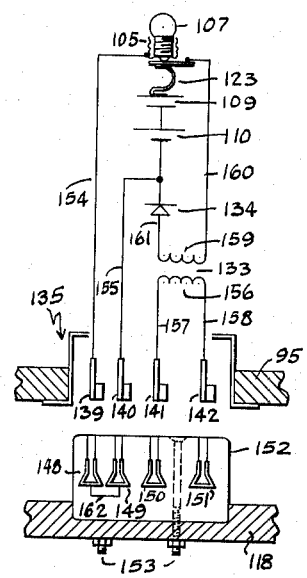
FIG. 37 is a wiring diagram for the lamp of FIG. 36 as it is mounted in position on a boat.
Figure 32:
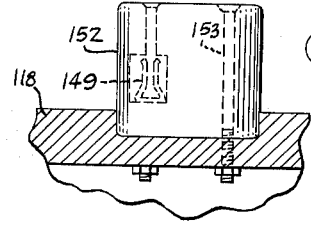
FIG. 32 is a side elevation of a mounting means for a modified running light of the type of FIG. 21 and mounted on a deck which is shown in section.

A modified arrangement for mounting this running light and recharging its cells is shown in FIGS. 32–37. In this arrangement the transformer 133 and the diode rectifier 134 corresponding to the transformer 59 and diode 65 are mounted within the housing 96. Instead of the downwardly projecting plug-in receptacle 115, there is mounted in the base 95, as indicated in FIG. 34, a plug-in socket 135 extending upwardly through an opening in this base and secured therein by a flange 136 and screws 137. Within this socket at the upper end thereof is an insulating top wall or plug 138 carrying four downwardly extending contact blades 139, 140, 141 and 142, and one of these blades, such as the blade 139, having a laterally extending lug 143 to enter a similarly shaped slot 144 in the receptacle 152 for polarizing this socket and receptacle so they may be connected in one position only. As shown in FIGS. 32 and 33, the receptacle 152 is provided with entrance slots 144, 145, 146 and 147 adapted to receive blade contacts 139 to 142 respectively, each to engage corresponding spring receptacle contacts 148, 149, 150 and 151 in the receptacle plug 152, as shown in FIG. 37. This plug receptacle 152 is mounted in a recess in the top of the deck or similar support 118 and secured therein by any suitable means, such as the screws 153. This receptacle is mounted so as to project above the top of the deck or similar support, so that it may be plugged into the socket 135 in the base of a lamp corresponding to the lamp of FIG. 21.

When the lamp socket 135 is telescoped over the receptacle plug 152, the blade contacts 139 to 142 of the lamp socket 135, connected to the elements of the lamp corresponding to that of FIG. 21, as shown in FIGS. 36 and 37, respectively engage the contacts 148 to 151 of receptacle plug 152 as shown in FIG. 37. Thus, the contact blade 139 is connected to the screw shell 105 of the lamp socket by the lead 154, and the central contact 121 of the second cell is connected to the blade contact 140 by the lead 155. The blade contacts 141 and 142 are connected to the pirmary coil 156 of the transformer by the leads 157 and 158. The secondary 159 of the transformer is connected to the central lamp contact and conductor 123 and the central cell contact 121 by the leads 160 and 161, the diode 134 being in the lead 161. Thus when the lamp socket 135 is plugged over the receptacle 152, the contact blades 139 and 140 are in engagement with the receptacle contacts 148 and 149, respectively, and as these two contacts 148 and 149 are connected by the cross conductor 162 the lamp circuit is closed and the lamp will thus function. The blade contacts 141 and 142 will engage receptacle contacts 150 and 151, but as these two contacts are not connected the recharging circuit is not closed. The blade contacts of the socket 135 have the same widened end portions 15 and 15a as the contacts 11 and 12, providing the same locking means with receptacle plug 152 as is described in connection with the first form and FIG. 9, and also as described with the connecting means 115 and 117 of the running light of FIGS. 21 to 26. The free end portions of blade contacts 139 to 142 are widened the same as at 15 and 15a in FIG. 9 so that after socket 135 is telescoped over receptacle plug 152 it may be turned a partial revolution to lock it to this plug and lock the lamp to the deck.

For the recharging of the cells of this lamp a four-contact receptacle plug 163 (FIG. 36) is provided comprising an insulating body 164 provided with sockets or chambers in which are mounted receptacle contacts 165, 166, 167 and 168 with inlet slots 169 in the face of the plug leading one to each of these contacts. The two contacts 165 and 166 are not electrically connected, while the two contacts 167 and 168 are connected by the leads 170 and 171 to a plug-in cap 172 which may be plugged into an outlet receptacle of a 110-volt A.C. supply circuit, such, for example, as that provided in a boathouse or dock, to recharge the cells of the lamp when this plug receptacle 163 is plugged into the socket 135. As the receptacle 163 is plugged into the socket 135 the blade contacts 139 to 142 enter the slots 169 to respectively engage the contacts 165 to 168. As the two contacts 165 and 166 are not connected, when they are engaged by the contact blades 139 and 140 the lamp circuit will not be closed. However, the two contacts 141 and 142 in the lamp recharging circuit will engage the contacts 167 and 168 connected with the plug-in cap 172, and therefore the recharging circuit will be closed to recharge the cells of the lamp. As the contacts 167 and 168 are enclosed in the plug 164 they will not be exposed when the cap 172 is plugged into the outlet receptacle, and therefore there is no danger of the operator contacting them, and it will be seen in this arrangement the exposed blade contacts 139 to 142 are mounted in the socket 135 in the lamp where only low voltage circuits are involved when the lamp is disconnected from this plug 163, so there is no danger of injury from this type of lamp.

In the form of the device shown in FIGS. 38–43, there is shown an adapter whereby the electronic candle of FIG. 4 may be employed with the common type of table lamp used for candles in a restaurant, for example, without changing the construction of this lamp. Such a lamp is shown in FIGS. 38 and 39 comprising a hollow base 173 of any suitable shape in the upper end of which is mounted downwardly extending tapered socket 174 adapted to receive and support the lower end of a wax candle. The lamp also includes the metal shell 175 provided with the fingers 176 for holding the glass or plastic chimney 177. The parts 173, 174 and 175 may be secured together by soldering or welding as at 178. A suitable weight 179 is normally suspended from the lower end of the socket 174 by a supporting stud 180 to reduce the likelihood of the lamp being tipped over. To mount the electronic candle 5 in this lamp, there is provided an adapter 181 of molded insulating material, comprising a circular upper body portion 182 and a lower downwardly extending reduced portion 183. The upper portion is provided with a socket or recess 184 extending downwardly from the upper end thereof in which is mounted a socket plug-in member 185 of exactly the same structure as the socket member 6 of FIGS. 2, 3, 6, 7 and 8, and therefore the parts are given the same reference characters as used in these figures. This socket 185 is mounted in recess 184 by means of a flange 8 resting on the upper end of the member 181 and secured by suitable screws 186. Mounted on the lower end of the reduced lower portion 183 is a transverse spring strip 187. It is mounted in a transverse channel 188 in the lower end of the extension 183 by any suitable means, such, for example, as a rivet 189, and it has opposite end portions 190 inclined upwardly and outwardly from the extension 183, and provided with upwardly facing gripping teeth 191. This lower end portion is adapted to be inserted in the socket in the member 174, and when doing so the side members or fingers 190 are pressed inwardly, as shown in FIG. 39, with the teeth 191 engaging the opposite side walls of the socket to securely retain this adapter 181 within the lamp. Now by plugging the candle lamp 5 and its receptacle base 38 into the socket 6 in the member 181, the candle is securely mounted the same as shown in FIGS. 1 and 2, and the lamp circuit is closed through the contacts 13, 14, 11, leads 44, lamp screw shell 24, central contact connector 30, and through the cells to the central contact 37 and the pin 13, as described in connection with FIGS. 1–4. Thus with this adapter the lamp constructed to hold the usual wax candle may be adapted for use with this electronic candle without in any way requiring any reconstruction of the lamp.

It will be seen from the above that this invention comprises an electronic lamp operated by any suitable number of sealed electric cells, usually two, with means for recharging these cells, employing two circuits in both of which the cells form a part, one circuit being the lamp load circuit which is closed to light the lamp bulb when the lamp, such, for example, as the electronic candle or the running light, is plugged into the supporting socket, and in which it may be locked by a partial relative turning movement, and the other circuit comprising a recharging circuit for the cells which may be closed without closing the lamp circuit when the electronic candle or other lamp is plugged into the socket in the recharging rack. Thus this lamp may be used in any location without requiring the use of lead cords for plugging into an A.C. supply circuit, and therefore is independent of any such lead wires or plugs when used for lighting purposes. It is therefore adapted for such uses as candles and table lamps, running or navigation lights for boats, airplanes, miners' lamps and similar operations. Also, when not in use as an illuminating device, it may be easily and quickly plugged into a recharging rack to automatically recharge the cells of the electronic lamp between uses of the lamp for illuminating or signal purposes.

Having thus set forth the nature of my invention I claim:

1. A lamp comprising a base, an electrical connector socket mounted in the base comprising a central pin contact and a pair of upright blade contacts, an electrical connection between the pin and one blade contact, a light unit comprising a casing, a rechargeable cell in the casing, a connector mounted in the casing including a central contact engaging the pin and one electrode of the cell and receptacle contacts engaging the blade contacts, a lamp socket contact mounted in the casing and a central contact associated therewith, a lamp bulb in the lamp socket with its central contact engaging that of the lamp socket, a lamp circuit comprising an electrical connection from the central lamp socket contact to the other electrode of the cell and an electrical connection from the lamp socket contact to the receptacle contact engaging the blade contact connected with the central pin, and an electrical connection from the receptacle contact engaging the other blade contact to the central lamp socket contact.

2. A lamp comprising a base, an electrical connector socket mounted in the base comprising a central pin contact and a pair of upright blade contacts, an electrical connection between the pin and one blade contact, a light unit comprising a casing, a rechargeable cell in the casing, a connector mounted in the casing including a central contact engaging the pin and receptacle contacts engaging the blade contacts, means mounting a lamp bulb in the casing, a lighting circuit including a lamp bulb, the cell, the central pin and the receptacle contact engaging the blade contact connected with the pin, and a recharging circuit for the cell including a connection from one pole of the cell to the central pin and a connection from the other blade contact to the other pole of the cell.

3. A lamp comprising a base, an electrical connector socket mounted in the base comprising a central pin contact and a pair of upright blade contacts, an electrical connection between the pin and one blade contact, a light unit comprising a casing, a rechargeable cell in the casing, a connector mounted in the casing including a central contact engaging the pin and one electrode of the cell and receptacle contacts engaging the blade contacts, a lamp socket comprising spaced contacts mounted in the upper end of the casing, a lamp circuit including a connection from one of the lamp socket contacts to the other electrode of the cell, a connection from the other lamp socket contact to the receptacle contact engaging the blade contact connected with the central pin, and an electrical connection from the latter electrode of the cell to the other receptacle contact.

4. In combination, a base, an electrical connector socket mounted in the base comprising a central pin contact and a pair of upright blade contacts, a light unit comprising a casing, a rechargeable cell in the casing, a connector mounted in the casing including a central contact engaging the pin and one pole of the cell and receptacle contacts engaging the blade contacts, a lamp socket comprising spaced contacts mounted in the casing, an electrical connection from one lamp socket contact to one pole of the cell, an electrical connection from the other lamp socket contact to one of the receptacle contacts, an electrical connection from the first lamp socket contact to the other receptacle contact, a transformer, means for connecting the primary of the transformer to a source of alternating current, connections from the opposite ends of the secondary of the transformer to the central pin and the contact blade engaging the second receptacle contact, respectively, and a diode in one of the connections from the transformer secondary.

5. A lamp unit comprising a casing, a connector mounted in the casing comprising an insulating body enclosing a central contact and a pair of receptacle contacts, said body provided with entrance slots for contact blades leading to said receptacle contacts, a rechargeable cell in the casing, a lamp socket comprising spaced contacts mounted in the casing, an electrical connection from one lamp socket contact to one of the receptacle contacts, an electrical connection from the other lamp socket contact to one pole of the cell, an electrical connection from the latter connection to the other receptacle contact, and an electrical connection from the central contact to the other pole of the cell.

6. In combination a base, an electrical connector socket mounted in the base comprising a central pin contact and a pair of spaced upright blade contacts, an electrical connection between the pin and one of said blade contacts, a light unit comprising a casing, a rechargeable cell mounted in the casing, a receptacle connector mounted in the casing comprising an insulating body enclosing a central contact engaging the pin contact and a pair of receptacle contacts, said body provided with entrance slots for said blade contacts leading to the receptacle contacts, said receptacle body and the blade contacts provided with interlocking means to prevent inadvertent withdrawal of the insulating connector from the socket arranged to become effective and ineffective by relative turning movements of the connector while inserted in the socket, a lamp socket comprising spaced contacts mounted in the casing, an electrical connection from one of said lamp socket contacts to the receptacle contact engaging the blade contact connected with the central pin contact, an electrical connection from the central contact of the receptacle connector to one pole of the cell, an electrical connection from the other lamp socket contact to the other pole of the cell, and an electrical connection from the latter connection to the other receptacle contact.

7. A lamp unit comprising a casing, a connector mounted in the casing provided with a plurality of contacts adapted to engage similar contacts in a second connector, a rechargeable cell in the casing, a lamp socket comprising spaced contacts mounted in the casing, an electrical connection from one of the lamp socket contacts to a first contact in the connector, an electrical connection from the other lamp socket contact to one pole of the cell, an electrical connection from the other pole of the cell to a second contact in the connector, and an electrical connection from the first pole of the cell to a third contact in the connector.

8. In combination a support, an electrical connector mounted on the support comprising a plurality of contacts and an electrical connection between two of said contacts, a light unit comprising a casing, a rechargeable cell in the casing, a lamp socket comprising spaced contacts mounted in the casing, a second connector connected with the casing comprising a plurality of contacts engaging respectively the contacts of the first connector, an electrical connection from one lamp socket contact to one of the second connector contacts engaging one of the electrically connected contacts in the first connector, an electrical connection from the other lamp socket contact to one pole of the cell, an electrical connection from the other pole of the cell to the second contact in the second connector engaging the other electrically connected contact in the first connector, and an electrical connection from the first pole of the cell to another and separate contact in the second connector.

9. A lamp comprising: rechargeable electrical power supply storage means having first and second poles; lamp socket means adapted to retain an electric bulb, said socket means including first and second socket terminal means; first switching contact means electrically connected to said first socket terminal means; second switching contact means electrically connected to both of said second socket terminal means and said first pole; third switching contact means electrically connected to said second pole; storage recharging means; and means adapted to selectively alternatively interconnect either said first contact means with said third contact means or said second and third contact means with contacts of said storage recharging means.

References Cited by the Examiner

UNITED STATES PATENTS

| | | | |
|---|---|---|---|
| 2,668,228 | 2/1954 | Levinson et al. | 240—10.64 |
| 2,830,280 | 4/1958 | Webber | 240—10.6 |
| 2,848,598 | 8/1958 | Amlee | 240—10.63 |
| 2,876,410 | 3/1959 | Fry | 240—10.6 |
| 2,980,889 | 4/1961 | Meissner | 240—10.6 |
| 3,005,090 | 10/1961 | Moore | 240—10.6 |

FOREIGN PATENTS 850,069    9/1960    Great Britain.

NORTON ANSHER, *Primary Examiner.*

LAWRENCE CHARLES, *Examiner.*